United States Patent [19]

Bonta et al.

[11] Patent Number: 5,379,447

[45] Date of Patent: Jan. 3, 1995

[54] METHOD OF SELECTING A HANDOFF TARGET IN A CELLULAR COMMUNICATION SYSTEM

[75] Inventors: Jeffrey D. Bonta, Arlington Heights; Barry J. Menich, Schaumburg, both of Ill.

[73] Assignee: Motorola, Inc., Schaumburg, Ill.

[21] Appl. No.: 125,353

[22] Filed: Sep. 23, 1993

Related U.S. Application Data

[63] Continuation of Ser. No. 805,160, Dec. 11, 1991, abandoned.

[51] Int. Cl.⁶ ............................................... H04Q 7/00
[52] U.S. Cl. .................................. 455/33.2; 455/56.1; 379/60
[58] Field of Search .............. 455/33.2, 33.3, 56.1; 379/60

[56] References Cited

U.S. PATENT DOCUMENTS

| | | | |
|---|---|---|---|
| 4,527,284 | 7/1985 | Röttger | 455/33.2 |
| 4,718,081 | 1/1988 | Brenig | 455/33.3 |
| 5,042,082 | 8/1991 | Dahlin | 455/33.2 |

FOREIGN PATENT DOCUMENTS 0321739  12/1989  Japan ................................ 455/33.2

Primary Examiner—Edward F. Urban
Assistant Examiner—Andrew Faile
Attorney, Agent, or Firm—Anthony G. Sitko

[57] ABSTRACT

In a cellular radio-telephone system (50), a method of selecting an appropriate handoff target where the timing advance of a mobile has exceeded a timing advance threshold, the bit error rate has risen above a BER threshold, or the signal level has fallen below an RSSI threshold. The method includes discarding signal measurements of inappropriate base sites or base sites at excessive distance and performing calculations on the remaining measurements to select an appropriate handoff target.

10 Claims, 3 Drawing Sheets

METHOD OF SELECTING A HANDOFF TARGET IN A CELLULAR COMMUNICATION SYSTEM

This application is a continuation of 07/805,160 filed Dec. 11, 1991 now abandoned.

FIELD OF THE INVENTION

This invention relates to communication systems and more specifically to cellular communication systems.

BACKGROUND OF THE INVENTION

Cellular communication systems are known. Such systems are, typically, comprised of a number of cells, each having a service coverage area, and a number of cellular telephones (communication units). The service coverage areas of adjacent cells may be arranged to partially overlap in such a manner as to provide a substantially continuous coverage area in which a communication unit receiving service from one cell may be handed off to an adjacent cell with no interruption in service. The Groupe Special Mobile (GSM) Pan-European digital cellular system, as specified in GSM recommendations available from the European Telecommunications Standards Institute (ETSI) and incorporated herein by reference, is an example of just such a system.

A cell's radio coverage is provided by a base transceiver station (BTS). Each BTS may contain one or more transceivers (TRX) which can simultaneously receive on one frequency and transmit on another. Communication between a BTS and a mobile communication unit (or mobile station) (MS) typically occurs using a portion of a pair of frequencies (transmit and receive) temporarily assigned in support of the communication transaction at the BTS.

The pair of frequencies assigned for use at the remote site are typically referred to as a radio channel. Downlink transmissions (from BTS to MS) on the radio channel occur on a first frequency of the pair of frequencies. Uplink transmissions (from MS to BTS) on the radio channel occurs on the second frequency of the pair of frequencies.

The GSM system is a TDM/TDMA system providing eight full duplex signal paths (8 TDM slots per TDM frame) on each radio channel. A single, primary radio channel assigned to a BTS, by virtue of its being time multiplexed, can support up to seven full rate duplex traffic users (speech or data) in addition to a multiplexed common control channel within the eight TDM slots. Additional, secondary radio channels assigned to the same cell can provide a full complement of eight full rate traffic users (in the 8 TDM slots) per radio channel, since the control channel within the primary radio channel can control allocation of communication resources on secondary radio channels.

Transmissions (control or speech and/or data traffic) from a BTS to an MS, on the downlink, occupy a first TDM slot (downlink slot) on a first frequency of a radio channel and transmissions from a communication unit to a BTS, on the uplink, occupy a second TDM slot (uplink slot) on the second frequency of the radio channel. The uplink slot on the second frequency is displaced in time three TDM slot positions following the downlink slot on the first frequency. The uplink slot on the second frequency is offset 45 MHz lower in frequency than the downlink. The uplink slot and downlink slot (together providing a two-way signal path for a single user) may be referred to as a "communication resource", allocated by the BTS to an MS for exchanging signals. The term "communication resource" also typically includes an associated signalling channel, as for example the GSM specified slow associated control channel used with traffic channels.

Exchanges of paging and setup control information within GSM between MSs and BTSs typically occurs on the common control channel (CCCH) which occupies at least one slot of a primary channel of the BTS. Transmitted by the BTS on the CCCH are distinctive identification signals as well as synchronization and timing information common to all other frequencies and slots of the BTS. CCCH information allows an MS to differentiate between primary and non-primary channels.

Upon activation, an MS scans a set of frequencies in search of CCCH identification signals transmitted from proximate BTSs. Upon detecting a CCCH identification signal, the communication unit measures a signal quality factor (such as signal strength) of the identification signal as a means of determining relative proximity of the BTS. Upon completing the scan of frequencies within the set, the MS generally selects the BTS providing the largest relative signal quality factor as a serving BTS. Upon identifying, and locking onto a suitably strong signal (and registering if necessary) the communication unit monitors the selected CCCH for incoming calls. Should the communication unit desire to initiate a call, an access request may be transmitted using the CCCH of the serving BTS.

During normal operation (including during active calls), the MS monitors for, identifies, and measures a received signal strength indication (RSSI) of primary channels of nearby BTSs. If involved in an active call, the MS relays measurement information back to the base site on an associated signaling channel. Through such a process, it is possible for the MS to maintain an association with the most appropriate (proximate) BTS. The process may entail an autonomous switching by the MS to a different BTS, causing perhaps a re-registration by the MS with the system indicating that such a switch has occurred. Alternatively, during an active communication exchange, the MS may be commanded by the system to handover to a more appropriate BTS.

Under GSM, a decision to handoff a communication unit to a target BTS may be based upon a power budget expression (see GSM Recommendation 5.08) having the form:

$$PBGT(n) = (Min(MS\_TXPWR\_MAX,P) - RXLEV\_KL\text{-}PWR\_C\_D) - (Min(MS\_TX\text{-}PWR\_{MAX}(n),P)\text{-}RXLEV\_NCELL(n))$$

The power budget expression (PBGT(n)) provides a method of comparing a path loss of an MS and serving cell (PBGT(s)) with a path loss of the MS and a potential handoff target cell (PBGT(t)). A handoff may be initiated when (PBGT(n)) exceeds a handover threshold value selected by a system operator. The handover threshold within a communication system may be selected to be as small as possible (above normal signal variations) to minimize transmitter power levels and mutual interference within a reusing system. Handoff may be initiated by the serving BTS transmitting an ID of a TCH allocated for use in the transfer target cell.

Under GSM, handover may also be desireable when the MS exceeds a specified distance from a serving BTS. Handoff may be desireable in such case to minimize effective cell size and to insure that an MS is served from the nearest BTS. Other handover causes, as specified in GSM recommendation 5.08, include handover for reason of RXQUAL (high bit-error-rate threshold), and handover for reason of RXLEV (downlink threshold or uplink threshold).

Where the decision to handoff is based on distance, the parameter that may be used as an indication of distance is the timing advance value. The timing advance value is a parameter that may be measured by a BTS based upon round-trip signal delay of a signal transmitted from the BTS to the MS and back to the BTS. The measured value may then be used to adjust the timing of the MS to ensure that transmissions from MSs arrive at a BTS within the slot assigned to the MS.

Under GSM, the timing advance value may be adjusted over a range from a value near zero (for MSs proximate the BTS) to a maximum threshold value dependent upon the diameter of the cell. When the timing advance value for an MS exceeds the threshold value, a handoff may be initiated by the serving BTS.

Use of thresholds based upon timing advance may allow a cell to control the effective service coverage area within which service is offered. Handoff of an MS based upon distance may force an MS crossing a periphery of the service coverage area to handover to an adjacent, closer cell. Such an algorithm may allow the handover MS to reduce power in exchanging a communicated signal thereby reducing overall system interference.

Where the decision to handoff is based upon RXQUAL, it may be determined that the high bit errors are due to noise (as opposed to interference). Where the decision to handoff is based upon bit error rate due to noise the determination may be further based upon the level of uplink RSSI or downlink RSSI. In either case a RXQUAL or RXLEV handover decision may be based upon parameters providing an inference that the mobile is near the perimeter of the service coverage area of the cell. Such an inference may be further substantiated by timing advance values.

While the prior art handover algorithm has worked well, problems have been experienced in target selection. Handoff based on operation of the power budget expression insures that an MS is served from a BTS offering the lowest signal path loss. The BTS offering the best path loss, on the other hand, may not be the most proximate BTS. If, because of obstructions or other local signal conditions, the signal path to a proximate BTS is blocked, then handoff to an inappropriate BTS may occur. Handoff to an inappropriate cell may be initiated based upon results of the power budget equation or on timing advance.

Where the handoff is initated based upon timing advance, RXQUAL, or RXLEV, then the results of the power budget equation are not considered (vis-a-vis the original serving cell and handover target). Because of differences in signal path, upon reaching a target BTS the MS may immediately transfer back to the original serving cell based upon results of the power budget equation.

Upon determination that a handover is required because of timing advance, RXQUAL, or RXLEV, a target cell may be selected based upon relative RSSI values measured by the MS. Under GSM any cell providing the largest relative RSSI value (above a minimum threshold) may be selected. The largest relative RSSI value, on the other hand, may be of a lower value than the original cell. Where the target cell provides a lower RSSI value than the original cell, the result may be poorer signal quality. The MS upon reaching the target cell may immediately request handoff (based upon results of the power budget expression) back to the original cell based on the higher RSSI value in the original cell. The result may be the MS "ping-ponging" between cells. Ping-ponging results in inefficient use of infrastructure equipment and signal links.

Even where the highest relative RSSI value is greater than the original cell the providor of the highest relative RSSI value may be co-sited with the original cell and may, therefore, not be a practical handoff target. Upon transfer of the MS to the target co-sited cell the target cell may again initiate timing advance, RXQUAL, or RXLEV, handoff based on similar timing advance, RXQUAL, or RXLEV characteristics, resulting once again, in the MS "ping-ponging" between cells.

In general, because of local signal conditions (signal obstructions, etc.) the cell providing the highest relative RSSI value may not be the closest, or the most appropriate BTS. Because of the above described difficulties a need exists for a better method of selecting targets upon detection of the need for handoff based upon perceived distance from a serving base site.

SUMMARY OF THE INVENTION

In a cellular system, a method of selecting a target cell for a timing advance handoff is disclosed. The method includes the step of identifying reported RSSI values of appropriate opposing cells and calculating a power budget value based upon the reported RSSI values for each of the identified opposing cells. The method also includes the step of selecting the opposing cell providing the largest relative magnitude power budget value as the handoff target.

DETAILED DESCRIPTION OF THE PREFERRED EMBODIMENT

The solution to the problem of target selection during handoff due to timing advance, RXQUAL, or RXLEV lies, conceptually, in a technique by which the location of the MS (and the identity of the most appropriate BTS) may be inferred from measured signal values. The measured signal values may be RSSI values, of BTSs, measured by a MS. Alternatively, the measured values may be RSSI values of the MS measured by surrounding BTSs.

Figure 6:
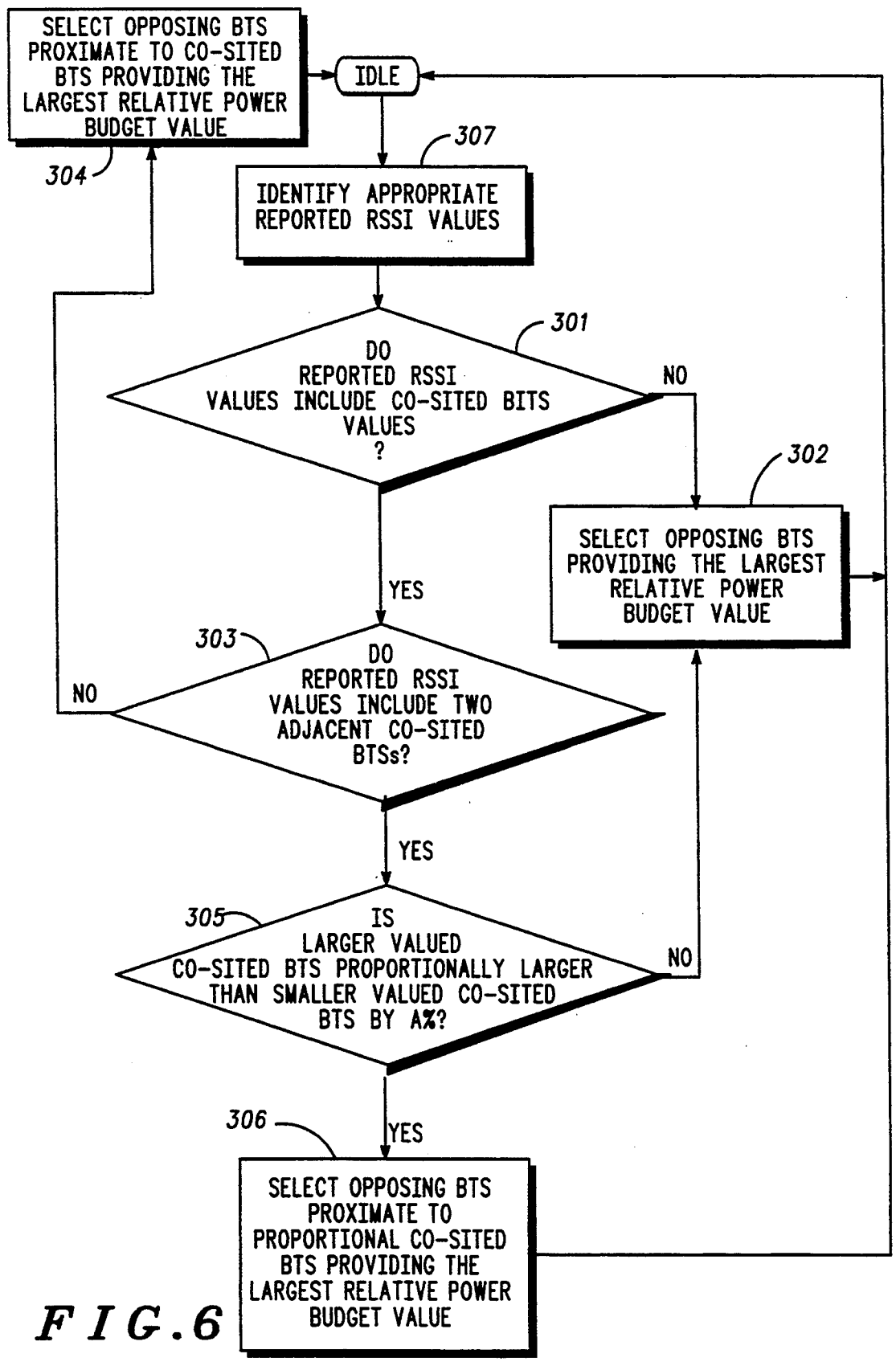
FIG. 6 depicts a flow chart of handoff under the invention.

Shown in FIG. 6 is a flow chart of the allocation of target BTS selection under the invention. Reference will be made to the flow chart (FIG. 6) as necessary to the understanding of the invention.

Figure 1:
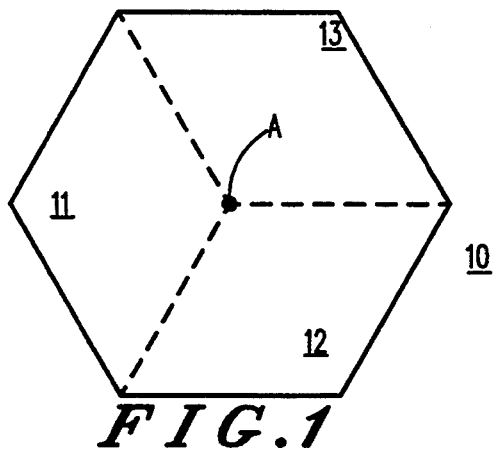
FIG. 1 depicts a geographic area receiving communication services from three co-sited BTSs.

Shown in FIG. 1 is a geographic area (10) within which mobile communication services may be offered through communication equipment located at a central site (A). Communication services within such a geographic area (10) may be offered within portions of the geographic area (10) through co-sited BTSs located at the central site (A), with each BTS serving a smaller geographic area (11, 12, or 13) of geographic area (10) through a directional (e.g. 120°) antenna.

Figure 2:
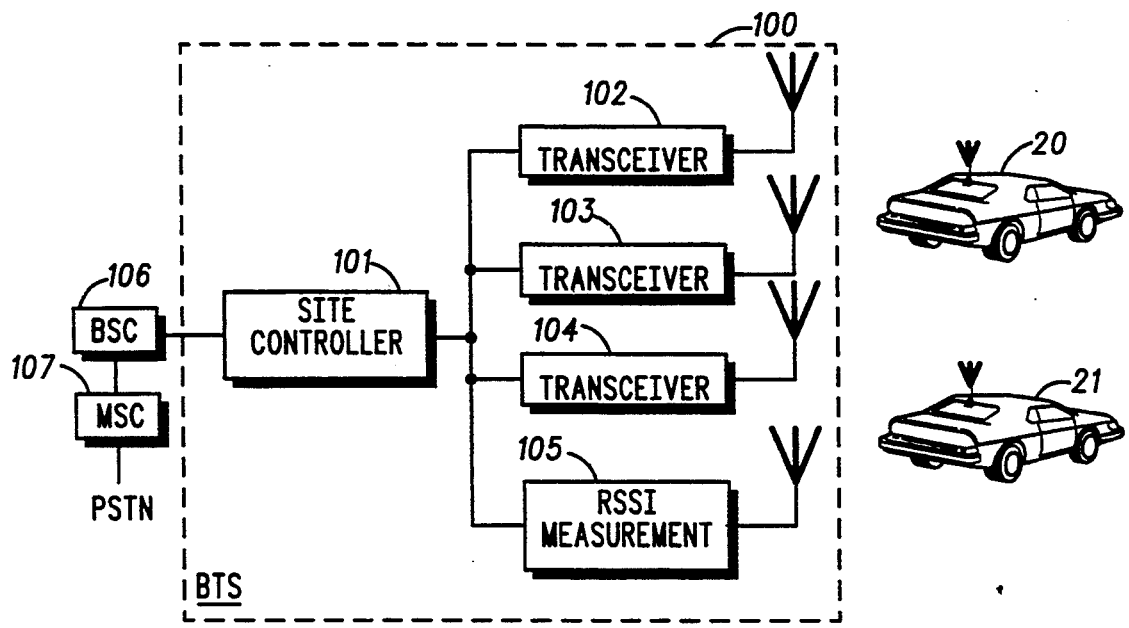
FIG. 2 comprises a block diagram of a base station system according to the invention.

Referring now to FIG. 2 is shown a block diagram of a BTS that may be located at the central site (A) and from which mobile communication services may be offered to a mobile station (MS) (20 or 21) located within the smaller geographic areas (11, 12, or 13) of geographic area (10). Each BTS (100), shown generally under the invention within the dotted lines of FIG. 2, may include a site controller (101), a number of transceivers (102, 103, and 104), and a RSSI measurement device (105). Each BTS (100) may be controlled by a base site controller (BSC) (106). Each BSC (106) may, in turn, control a number of BTSs (100). The BSC (106) is controlled by a mobile switching center (MSC) (107). Likewise, each MSC (107) may control a number of BSCs (106).

Figure 4:
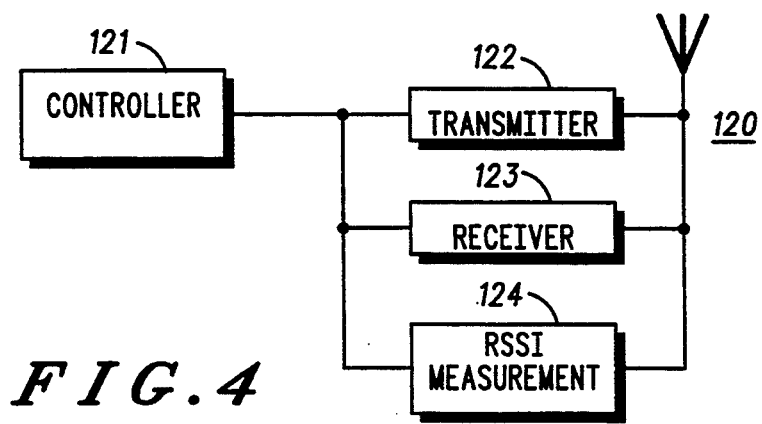
FIG. 4 comprises a block diagram of a MS according to the invention.

Shown in FIG. 4 is a block diagram generally (120) of a MS (20 or 21). Included within an MS is a controller (121), a transmitter (122), a receiver (123), and an RSSI signal measurement device (124).

Figure 3:
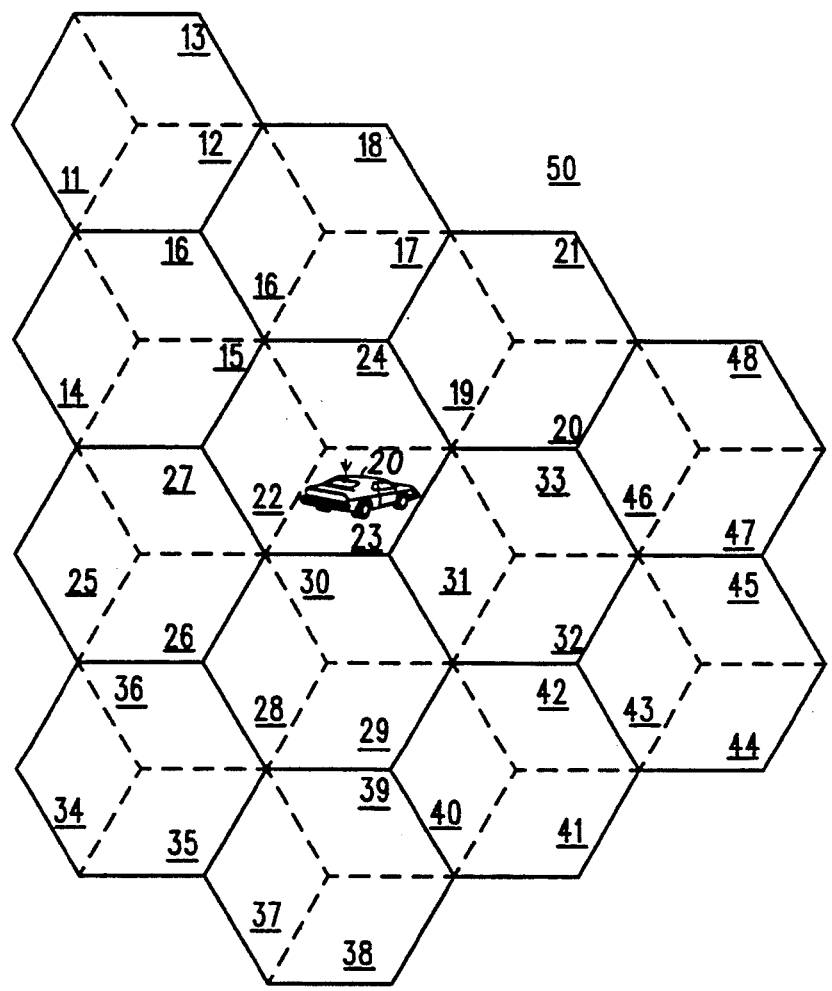
FIG. 3 depicts a large geographic area within which communication services are provided from a number of BTSs.

Shown in FIG. 3 is a communication system comprised of a number of geographic areas (10), combined to provide a substantially continuous coverage area within a large geographic area (50) such as a metropolitan area of a city, etc. MSs located within smaller geographic areas (11 through 48) may receive communication services through BTSs (100) serving the smaller geographic area (11 through 48). (A BTS (100) serving a smaller geographic area (11 through 48) will, hereinafter, be referred to by reference to the geographic area served (e.g. BTS 11, etc.).)

Following activation, MSs (20 or 21) detect the presence of proximate BTSs (11 through 48) through signals transmitted by BTSs (11 through 48) for the benefit of the MSs (20 or 21). The downlink CCCH of a BTS (11 through 48) contains distinctive identification signals as well as synchronization and timing information common to an assigned spectrum (frequencies (FRNs) 1-N) and slots of the transmitting BTS (11 through 48). Transmitted along with the timing and synchronization information is a nonambiguous frame number (FN) (see GSM Recommendation 4.3.3). The FN provides a means for associating a long repeat period, incrementing number to time frames. The nonambiguous FN is utilized by the MS (20 or 21), in conjunction with other information communicated to the subscriber MS (20 or 21) from the BTS (11 through 48) such as the hopping algorithm used, the set of hopping frequencies (MA), and a user specific number (MAIO) (see GSM Recommendation 6.2.2) to allow the subscriber MS (10), to determine the specific frequency used for a particular frame. The particular hopping algorithms employed and the prudent assignment of parameters by the cellular system controller (BSC 106) ensures that the instantaneous radio frequencies used by each MS (20 or 21) served by a particular BTS (11 through 48) are distinct and nonoverlapping.

As an example, MS (20) (FIG. 3), desiring access to the system, scans for and identifies the CCCH of the BTS (23). The MS (20) monitors for and detects information (FN, MA, and MAIO) defining a uplink communication resource over which to transmit an access request. Upon transmitting the access request the MS (20) monitors the CCCH on the downlink primary channel ($f_1$) for channel assignment messages.

As provided within GSM recommendations, channel assignment messages are communicated from the BTS (23) to the MS (20). These assignment messages, through suitable encoding, provide the user MS (20) with the specific parameters necessary to unambiguously determine the specific frequency and slot in which information between the BTS and MS may be exchanged.

Under the invention, communication units (20 and 21) and BTSs (11 through 48) are constructed (FIG. 4) to exchange signals as described above and substantially as specified under GSM. Accordingly, communication units (20 and 21) request access to and are granted traffic channels (TCHs) substantially as specified under GSM recommendations.

Upon assignment of a TCH, a communication unit (20) (FIG. 3) tunes to the assigned frequency and slot and begins exchanging a communicated signal through the serving BTS (23). While exchanging the communicated signal the communication unit (20) scans for and, upon detection, measures a received signal strength indication (RSSI) of broadcast control channels (BCCHs) of nearby BTSs (e.g. 22, 23, 24, 19, 33, 31, 30, 28, 26, and 27). Upon detecting and measuring a BCCH the communication unit also receives and decodes an ID of the transmitting BTS (e.g. 22, 23, 24, 19, 33, 31, 30, 28, 26, and 27).

The communication unit (20) may communicate the RSSI and ID of each detected BTS to the serving BTS (23) on a slow associated control channel (SACCH) associated with the assigned TCH. The RSSIs and IDs are, in turn transferred to the BSC (106). RSSIs and associated IDs of as many as six, detected BTSs may be transmitted to the BTS (23) on the SACCH, forwarded to the BSC (106) and stored as reported RSSI values.

In one embodiment of the invention, the identity of the six detected BTSs may be examined and co-sited BTSs or BTSs within a predetermined distance (e.g. a microcell) may be beneficially eliminated as potential handover targets. Comparisons may then be made of the remaining BTSs under the power budget expression to determine the most appropriate handover BTS.

Figure 5:
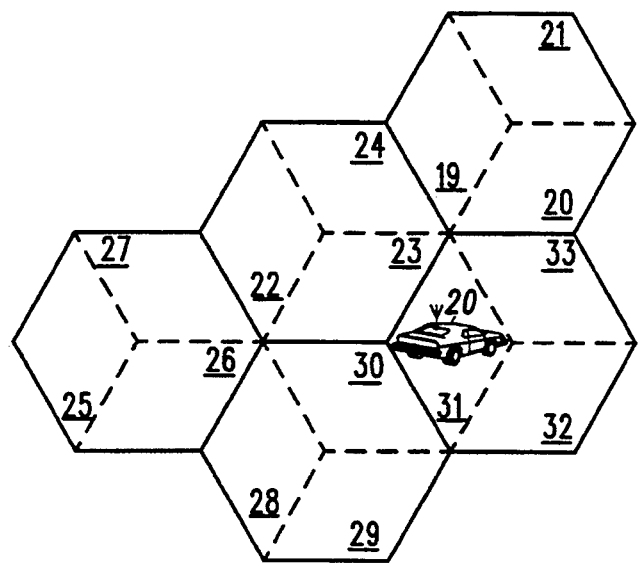
FIG. 5 depicts a MS outside the service coverage area of a serving BTS about to be handed-off according to the invention based on timing advance.

Shown in FIG. 5 is an example of such a case. In FIG. 5 the MS (20), exchanging a communicated signal through a serving BTS (23) has moved into the service coverage area of an adjacent BTS (31). As the MS (20) moves into the adjacent service coverage area (31) the MS (20) may transmit RSSI values to the serving BTS (23) of −87 dbm on frequency f1 from BTS 23, −90 dbm on frequency f2 from BTS 24, −100 dbm on frequency f3 from BTS 31, −101 dbm on frequency f4 from BTS 30, −105 dbm on frequency f5 from BTS 33, and −106 dbm on frequency f6 from BTS 20.

As the MS (20) moves into the adjacent BTS (31) the timing advance of transmitted signals from the MS (20) must be increased to compensate for increasing distance. If a power budget handover does not occur to the adjacent BTS (31) (because of an obstruction or otherwise) then the timing advance may reach a timing advance threshold for the system (typically 150-200% of timing advance at the periphery of the serving BTS (23)), or the uplink/downlink RSSI may reach an RXLEV threshold, or the uplink/downlink bit error rate may reach an RXQUAL threshold. In such case the threshold exceeded (timing advance, or RXQUAL, or RXLEV) may result in a determination of a need to handoff.

Upon detecting the need for handover based upon timing advance, RXQUAL, or RXLEV the controlling BSC (106) (in the case of an inter-BTS handover) or the MSC (107) (in the case of an inter-BSC handover), as a first step according to the invention, discards (307) RSSI values from inappropriate BTSs. In the case of a timing advance, RXQUAL, or RXLEV handover from BTS 23, appropriate handover targets according to the invention are those BTSs having service coverage areas adjacent to and opposing the sectored antenna of the serving BTS (23) (appropriate, opposing BTSs). Appropriate opposing BTSs, according to the invention, are comprised of BTSs (26, 28, 30, 31, 33, and 20).

In the above example, BTS 24 is not an appropriate handover target and is therefore not considered as a handover target. Power budget calculations are then performed relative to the four remaining RSSI values. If MS_TXPWR_MAX is equal to P in each BTS, PWR_C_D of BTS (23) is zero, and and maximum power of MS (20) is equal to 43 dbm then calculation of PBGT(n) produces calculated values as follows:

$$PBGT(20) = ((43)-(-87)-0)-((43)-(-106)) = -19 \text{ db}$$

$$PBGT(30) = ((43)-(-87)-0)-((43)-(-101)) = -14 \text{ db}$$

$$PBGT(31) = ((43)-(-87)-0)-((43)-(-100)) = -13 \text{ db}$$

$$PBGT(33) = ((43)-(-87)-0)-((43)-(-105)) = -18 \text{ db}$$

The handover target selected (302) based upon such calculations would be to BTS 31 based upon the largest relative PBGT(n) value. Handover, in such case, would be to BTS 31.

In another embodiment of the invention, a threshold value may be set by a system operator specifying a threshold value of PBGT(n) for handover to occur. In such a case where a minimum value of PBGT(n) is set and the threshold had not been exceeded, then handover based upon timing advance, RXQUAL, or RXLEV would be deferred pending a change in reported RSSI values. Upon occasion that the timing advance threshold is exceeded, then handover may occur as above The use of a handover theshold value of zero (PBGT(n)-0) may require that signal quality in a handover target BTS be at least as good as the signal quality in the original serving cell. The use of a PBGT(n) threshold of zero, or larger, would substantially eliminate ping-ponging following handoff by ensuring that the handoff BTS provides substantially the same signal quality as the orignal, serving BTS.

In another embodiment of the invention reported RSSI values of co-sited BTSs may be used to reduce the number of appropriate opposing BTS handoff targets and provide an estimate of the location of an MS. In such a case the presence (301) of an RSSI measurement from a co-sited BTS (reporting co-sited BTS) may indicate that the MS has moved to a location within an opposing BTS proximate the service coverage area of the co-sited BTS.

In the above example of the MS (20), served from BTS 23 and providing a reported RSSI value from co-sited BTS 24, the reported RSSI value from the co-sited BTS (24) may be used to limit appropriate handoff targets to opposing BTSs 31, 33, and 20 proximate the co-sited BTS (24). Handoff, in such a case, may be based upon the largest relative PBGT(n) value. Handoff in such case, as above, may be dependent (304) upon a PBGT(n) threshold value.

In another embodiment of the invention, reported RSSI values of more than one co-sited BTS (303) may be used to reduce the number of appropriate opposing BTSs as transfer targets. In the above example where an MS (20) receiving service from BTS 23 were to report RSSI values from co-sited BTS 22 as well as from BTS 24 then a comparison may be used to limit handoff (306) to opposing BTSs that are nearest the co-sited BTS providing a proportionally larger RSSI value (proportional co-sited BTS).

The use of a proportionally larger RSSI value from a co-sited BTS to limit appropriate, opposing BTSs may be based upon an assumption that if a first RSSI value from one (24) of the two co-sited BTS is a percentage (e.g. A%) larger (exceeds a proportional threshold) than a second RSSI value from the second (22) of the two co-sited BTSs then a high probability exists that the MS (20) is located in a service coverage area of an opposing BTS (31,33, or 20) proximate the proportional co-sited BTS. In limiting consideration of appropriate handoff targets to the opposing BTSs (31, 33, and 20) proximate to the proportional co-sited BTS (24), handoff to inappropriate BTSs, or BTSs that may immediately re-transfer to another target, is reduced. Selection of a handoff target from the opposing BTS (31, 33, or 20) may, as above, be based upon the results of the PBGT(n) calculations.

In a further embodiment of the invention, RSSI values are measured by BTSs surrounding the serving cell (23). In such a case BTSs 22, 24, 19, 20, 33, 31, 30, 28, 26, and 27 measure the RSSI value of a signal transmitted by the MS (20). An appropriate handoff target may be based on PBGT(n) calculations of the six opposing BTSs (28, 30, 31, 33, and 20) or the list of appropriate targets may be reduced, as above, by selecting opposing cells proximate a proportional co-sited BTS.

We claim:

1. In a cellular communication system, a method of selecting a target cell for a handoff, the method comprising the steps of:
   A) excluding as potential target cells cells which are not adjacent to a serving cell and which do not have an antenna directionally opposing a directional antenna of the serving cell
   B) identifying the reported RSSI values for potential target cells;
   C) calculating a power budget value based upon the reported RSSI values for each of the potential target cells; and,
   D) selecting as the target cell a potential target cell providing the largest relative magnitude power budget value.

2. The method as in claim 1 wherein the step of selecting the target cell further comprises deferring handoff upon occasion that a reported RSSI value of a serving cell exceeds the reported RSSI value of the target cell.

3. The method as in claim 2 further including the step of handing off a mobile station to the target cell.

4. The method as in claim 1 wherein the step of identifying the reported RSSI values of potential target cells further includes only identifying the reported RSSI values of potential target cells proximate a reporting co-sited cell.

5. The method as in claim 1 wherein the step of identifying the reported RSSI values further includes only identifying the reported RSSI values of those potential target cells proximate a co-sited cell exceeding a proportional threshold.

6. In a cellular communication system, an apparatus for selecting a target cell for a handoff, the apparatus comprising:

A) means for excluding as potential target cells cells which are not adjacent to a serving cell and which do not have an antenna directionally opposing a directional antenna of the serving cell;

B) means for identifying the reported RSSI values of potential target cells;

C) means for calculating a power budget value based upon the reported RSSI values for each of the potential target cells; and, D) means for selecting as the target cell a potential target cell providing the largest relative magnitude power budget value.

7. The apparatus as in claim 6 wherein the means for selecting further comprises means for deferring handoff upon occasion that a reported RSSI value of a serving cell exceeds the base transceiver station reported RSSI value of the target cell.

8. The apparatus in claim 7 further comprising means for handing off a mobile station to the target cell.

9. The apparatus as in claim 6 wherein the means for identifying the reported RSSI values of potential target cells further comprises means for only identifying the reported RSSI values of potential target cells proximate a reporting co-sited cell.

10. The apparatus as in claim 6 wherein the means for identifying the reported RSSI values of potential target cells further comprises means for only identifying the reported RSSI values of potential target cells proximate a co-sited cell exceeding a proportional threshold.

* * * * *